July 12, 1960  M. DE GROOTE ET AL  2,944,984
PROCESS FOR BREAKING PETROLEUM EMULSIONS EMPLOYING CERTAIN
OXYALKYLATED TRIS(HYDROXYMETHYL)AMINOMETHANES
Filed June 10, 1954
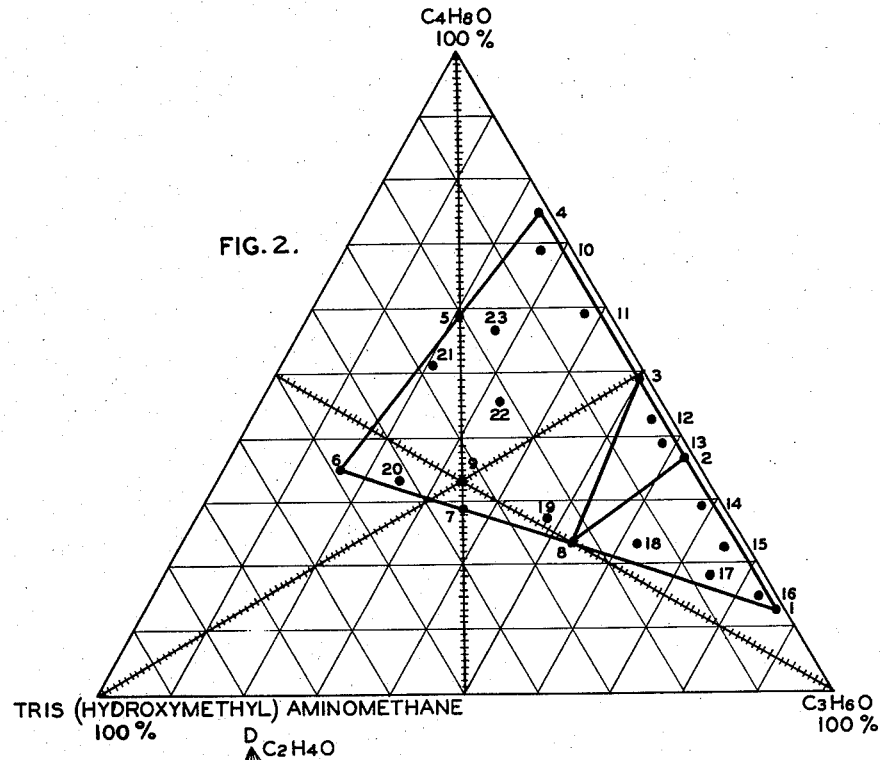
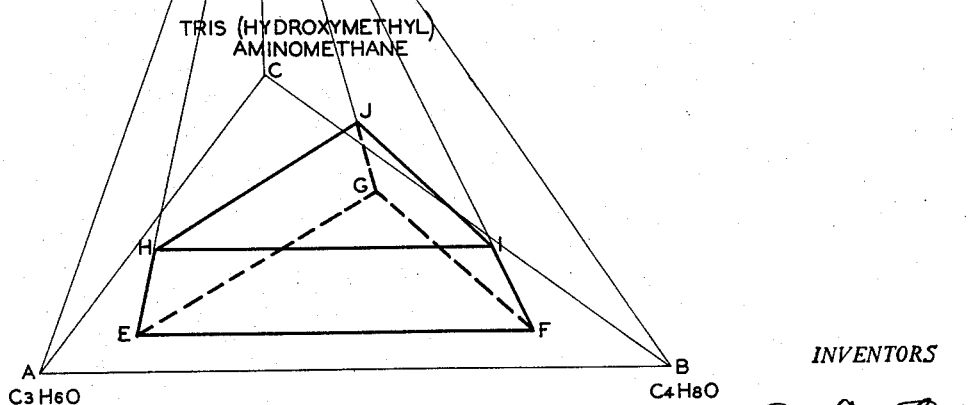
INVENTORS United States Patent Office 2,944,984
Patented July 12, 1960

2,944,984

PROCESS FOR BREAKING PETROLEUM EMULSIONS EMPLOYING CERTAIN OXYALKYLATED TRIS(HYDROXYMETHYL)AMINOMETHANES

Melvin De Groote, University City, and Owen H. Pettingill, Kirkwood, Mo., assignors to Petrolite Corporation, Wilmington, Del., a corporation of Delaware Filed June 10, 1954, Ser. No. 435,670

20 Claims. (Cl. 252—344)

This invention relates to processes or procedures particularly adapted for preventing, breaking or resolving emulsions of the water-in-oil type, and particularly petroleum emulsions.

Our invention provides an economical and rapid process for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification under the conditions just mentioned are of significant value in removing impurities particularly inorganic salts, from pipeline oil.

More specifically then the present invention is concerned with a process for breaking petroleum emulsions employing a demulsifier including a cogeneric mixture of a homologous series of glycol ethers of tris(hydroxymethyl)aminomethanes. The cogeneric mixture is derived exclusively from tris(hydroxymethyl)aminomethanes, ethylene oxide, propylene oxide and butylene oxide, in such weight proportions so the average composition of said cogeneric mixture in terms of the initial reactants lies approximately within the truncated triangular pyramid identified as E, H, F, I and G, J, in Figure 1; with the proviso that the percentage of ethylene oxide, by weight, is within the limits of 2% to 39.5 and the remaining three initial reactants recalculated to 100% basis lie approximately within the triangular area defined in Figure 2 by points 1, 4, 6. However, as will be pointed out subsequently the same ultimate compositions may be employed using any one of the three oxides last.

The oxyalkylation of tris(hydroxymethyl)aminomethanes by means of ethylene oxide, propylene oxide, or butylene oxide has been described in the literature. One can use instead of the oxides the corresponding alkylene carbonates, to wit, ethylene carbonate, propylene carbonate, or butylene carbonate.

As is well known, the oxyalkylation derivatives from any oxyalkylation-susceptible compound, are prepared by the addition reaction between such oxides and such compound. The addition reaction is advantageously carried out at an elevated temperature and pressure and in the presence of a small amount of alkaline catalyst. Usually, the catalyst is sodium hydroxide or sodium methylate. The reaction temperature is apt to be 140° C. or somewhat less, and the reaction pressure not in excess of 30 to 50 pounds per square inch. The reaction proceeds rapidly. See, for example, U.S. Patent No. 2,636,038, dated April 21, 1953, to Brandner, although another hydroxylated compound is employed.

As to further information in regard to the mechanical steps involved in oxyalkylation, see U.S. Patent No. 2,499,365, dated March 7, 1950, to De Groote et al. Particular reference is made to columns 92 et seq.

The oxyalkylation of a liquid or a solid which can be melted at comparatively low temperature (under 150° C.) without decomposition or is soluble in an inert solvent, such as xylene, presents little or no mechanical difficulties in the oxyalkylation step. When one has a solid which cannot be melted, or decomposes on melting, and is insoluble in xylene, a slurry may be employed as in the case of the oxyalkylation of sucrose. See U.S. Patent No. 2,652,394, dated September 15, 1953, to De Groote. Actually, as far as oxyalkylating a slurry of a xylene-insoluble solid in xylene the procedure is substantially the same for pentaerythritol, or sorbitol, or sucrose, or for that matter, for glucose, or a solid amine such as tris(hydroxymethyl)aminomethane.

The oxyalkylation of tris(hydroxymethyl)aminomethane can be accomplished in a number of ways and the particular procedure is immaterial. The method employed is substantially the same as in the case of glucose, sucrose, or for that matter any reactive solid amine. Such procedure has been described in numerous patents and specific reference is made to the instant application which is concerned with ethylene oxide and butylene oxide or the equivalents. Actually, whether one uses ethylene oxide or butylene oxide or, for that matter, propylene oxide one preferably starts with tris(hydroxymethyl)aminomethane suspended in a slurry in xylene or a similar unreactive solvent; or one employs an alkylene carbonate such as ethylene carbonate, butylene carbonate or propylene carbonate for the initial oxyalkylation. When such initial oxyalkylation has gone far enough to convert the solid mass into a product which at least is a liquid at oxyalkylation temperature it can be subjected to the oxides as differentiated from the carbonates. The carbonates, of course, cost more than the oxides.

When butylene oxide is used the same procedure can be followed as in the use of propylene oxide or ethylene oxide as described in U.S. Patent 2,626,935, dated January 27, 1953, to De Groote. Indeed, the oxyalkylation of tris(hydroxymethyl)aminomethane is substantially comparable to the oxyalkylation of sorbitol, particularly if one used powdered sorbitol in the form of a slurry. Such slurry is the equivalent of a slurry of tris(hydroxymethyl)aminomethane.

In the use of butylene oxide the same procedure can be employed as is described in the use of propylene oxide and the oxypropylation of glucose as described in U.S. Patent No. 2,626,935, dated January 27, 1953, and with the proviso, of course, that tris(hydroxymethyl)aminomethane is substituted for glucose. For instance, we have found we can oxybutylate tris(hydroxymethyl)aminomethane in the same manner that is used conventionally for oxypropylation of glucose. For example, we have followed the directions which appear in columns 7, 8 and 9 of aforementioned U.S. Patent 2,626,935 in regard to the oxyethylation or oxypropylation of glucose and find it is just as suitable in connection with butylene oxide. We have completed the reactions under the same conditions set forth in Examples 1a through 4a using propylene oxide and varied the procedure only in that the time required was somewhat slightly longer, and substituting, of course, tris(hydroxymethyl)aminomethane for glucose.

Other patents include specific information as to the oxypropylation of sugars or similar products including glucose. Actually the procedure is substantially the same whether one uses propylene, ethylene, or butylene oxide. It is not believed any examples are necessary to illustrate such well known procedure but for purpose of illustration the following are included:

Example 1a

The reaction vessel employed was a stainless steel autoclave with the usual devices for heating, heat control, stirrer, inlet, outlet, etc., which is conventional in this type of apparatus. The capacity was approximately 4 liters. The stirrer operated at a speed of approximately 250 r.p.m. There were charged into the autoclave 500 grams of tris(hydroxymethyl)aminomethane, 300 grams of xylene, and 15 grams of sodium methylate. The autoclave was sealed, swept with nitrogen gas and stirring started immediately and heat applied. The temperature was allowed to rise to approximately 150° C. At this particular time the addition of butylene oxide was started. The butylene oxide employed was a mixture of the straight chain isomer substantially free from isobutylene oxide. It was added continuously at such speed that it was absorbed by the reaction as added. The amount added in this operation was 1500 grams. The time required to add the butylene oxide was two hours. During this period the temperature was maintained at 135° to 150° C., using cooling water through the inner coils when necessary and otherwise applying heat if required. The maximum pressure during the reaction was 50 pounds per square inch. Ignoring the xylene and sodium methylate and considering the tris(hydroxymethyl)aminomethane for convenience, the resultant product represents 3 parts by weight of butylene oxide to one part by weight of tris(hydroxymethyl)aminomethane. The xylene present represented approximately .6 of one part by weight.

Example 2a

The reaction mass was transferred to a larger autoclave (capacity 15 liters). Without adding any more solvent or any more xylene the procedure was repeated so as to add another 1500 grams of butylene oxide under substantially the same operating conditions but requiring about 3 hours for the addition. At the end of this step the ratio represented approximately 6 to 1 ratio butylene oxide to tris(hydroxymethyl)aminomethane.

Example 3a

In a third step, instead of adding 1500 grams of butylene oxide, 1625 grams were added. The reaction slowed up and required approximately 6 hours, using the same operating temperatures and pressures. The ratio at the end of the third step was 9.25 parts by weight of butylene oxide per weight of tris(hydroxymethyl)aminomethane.

Example 4a

At the end of this step the autoclave was opened and an additional 5 grams of sodium methylate added, the autoclave flushed out as before, and the fourth and final oxyalkylation completed, using 1625 grams of butylene oxide, and the oxyalkylation was complete within 3¼ hours using the same temperature range and pressure as previously. At the end of the reaction the product represented approximately 12.5 parts of butylene oxide by weight to one part of tris(hydroxymethyl)aminomethane.

All the examples, except the first step, were substantially water-insoluble and xylene-soluble.

As has been pointed out previously these oxybutylated tris(hydroxymethyl)aminomethanes were subjected to oxyethylation in the same manner described in respect to the oxypropylated glucose in aforementioned U.S. Patent No. 2,626,935. Indeed, the procedure is comparatively simple for the reason that one is working with a liquid and also that ethylene oxide is more reactive than butylene oxide. As a result, using the same amount of catalyst one can oxyethylate more rapidly than usually at a lower pressure. There is no substantial difference as far as operating procedure goes whether one is oxyethylating oxypropylated tris(hydroxymethyl)aminomethane or oxybutylated tris(hydroxymethyl)aminomethane.

The same procedure using a slurry of tris(hydroxymethyl)aminomethane in xylene was employed in connection with ethylene oxide and the same mixture on a percentage basis was obtained as in the above examples where butylene oxide and tris(hydroxymethyl)aminomethane were used.

The same procedures have been employed using other butylene oxides including mixtures having considerable isobutylene oxide and mixtures of the straight chain isomers with greater or lesser amounts of the 2,3 isomer. Where reference has been made in previous examples to the straight chain isomer, the product used was one which was roughly 85% or more of the 1,2 isomer and approximately 15% of the 2,3-cis- and the 2,3-trans isomer with substantially none or not over 1% of the isobutylene oxide.

In the preceding procedures one oxide has been added and then the other. One need not follow this procedure. The two oxides can be mixed together in suitable proportions and subsequently subjected to joint oxyalkylation so as to obtain products coming within the specified limits. In such instances, of course, the oxyalkylation may be described as random oxyalkylation insofar that one cannot determine the exact location of the butylene oxide or ethylene oxide groups. In such instances the procedure again is identically the same as previously described and, as a matter of fact, we have used such methods in connection with tris(hydroxymethyl)aminomethane.

If desired, one may add part of one oxide and all of the other and then return to the use of the first oxide, for instance; or one may use the procedure as previously, adding first some butylene oxide, then ethylene oxide and then the butylene oxide. Or, inversely, one may add some ethylene oxide, then all butylene oxide and then the remainder of the ethylene oxide; or either oxide could be added in portions so that first one oxide is added, then the other, then the first oxide is added again, and then the second oxide. We have found no advantage in so doing. Indeed, our preference has been to add all the butylene oxide first and then the required amount of ethylene oxide.

As pointed out previously, tris(hydroxymethyl)aminomethane can be oxyethylated in the same way it is oxybutylated, i.e., by preparing a slurry in xylene or in a similar solvent and using a suitable alkaline catalyst such as caustic soda, sodium methylate, or the like, and then adding the ethylene oxide. The changes previously mentioned are of difference in degree only. In other words, oxyethylation will take place at a lower temperature, for instance, a top temperature of probably 130° to 135° C. instead of 145° to 150° C. The same weight of ethylene oxide could be added in 75% to 85% of the time required for butylene oxide. The pressure during the reaction, instead of being 35 to 45 pounds as in the case of butylene oxide, is apt to be 10 to 15 pounds and at times a little higher. Otherwise, there is no difference.

Also, if desired, the use of ethylene carbonate is a very convenient way of oxyethylating tris(hydroxymethyl)aminomethane. In fact, it can be oxyethylated without the use of pressure. Such procedure, and particularly melting the carbonate first and adding the tris(hydroxymethyl)aminomethane slowly permits the production of a reaction mass which is a liquid or which melts readily at comparatively low temperatures to yield a liquid. Such reaction should be conducted in such a way that there is no residual ethylene carbonate or for that matter propylene carbonate when the mass is transferred to an autoclave. In fact, propylene carbonate is more satisfactory than ethylene carbonate.

One can oxyalkylate using an acid catalyst or an alkaline catalyst or at least in part, without the use of any catalyst although such procedure is extremely slow and uneconomical. In other words, any one of the conventional catalysts used in oxyalkylation may be employed. It is our preference, however, to use an alkaline catalyst such as sodium methylate, caustic soda, or the like.

Actually, tris(hydroxymethyl)aminomethane may contain a trace of moisture. Our preference is to prepare the slurry with an excess of xylene and distill off a part of the xylene so as to remove any trace of water and then flush out the mass with nitrogen. Even so, there may be a few tenths of a percent of moisture remaining, although at times examination indicates at the most it is merely a trace.

Actually, the oxyalkylation of tris(hydroxymethyl)aminomethane, particularly if one uses a slurry in an inert solvent such as xylene, proceeds satisfactorily in the same manner described in U.S. Patent No. 2,552,528, dated May 15, 1951, to De Groote, wherein the product subjected to oxyalkylation is sorbitol. When butylene oxide is used the same procedure can be followed as in the use of propylene oxide as described in Example A in Part 2 of the aforementioned U.S. Patent 2,552,528; or, if desired, butylene oxide can be used and the same procedure can be followed as in the use of propylene oxide as described in Example 1a of the aforementioned U.S. Patent 2,626,935. The tris(hydroxymethyl)aminomethane is stirred with a solvent, such as diethylether of diethyleneglycol or, for that matter one may use ethylene glycol dimethyl ether, diethylene glycol dimethyl ether, triethylene glycol dimethyl ether, or tetraethyleneglycol dimethyl ether. As oxybutylation proceeds the reaction mass becomes a homogeneous mass.

Referring momentarily to U.S. Patent No. 2,552,528, the finely powdered sorbitol is reacted with butylene oxide and as oxybutylation takes place the reaction mass becomes a homogeneous liquid. For instance, referring to Example A, column 16 of aforementioned patent, we have used identically the same procedure starting with tris(hydroxymethyl)aminomethane. Instead of using 1600 grams of propylene oxide, there was used 1800 grams of butylene oxide (mixed straight chain isomers).

In Example B, instead of using 1100 grams of the propylene oxide derived intermediate from Example A, preceding, there was used instead 1191 grams of the butylene oxide derived intermediate, Example A. Instead of using 1327 grams of propylene oxide there was added 1493 grams of butylene oxide.

In Example C, instead of using 1149 grams of propylene oxide derived intermediate Example B, from the preceding example, there was used instead 1271 grams of butylene oxide derived intermediate B. Instead of adding 1995 grams of propylene oxide in this stage, there was added instead 2345 grams of butylene oxide.

In Example D, instead of 743 grams of the propylene oxide derived intermediate from Example C, preceding, there was used 831 grams of the butylene oxide derived intermediate. Instead of adding 637 grams of propylene oxide in this stage, there was added 717 grams of butylene oxide.

It will be noted at this stage the ratio of butylene oxide to tris(hydroxymethyl)aminomethane was approximately 100-to-1, and the amount of tris(hydroxymethyl)aminomethane represents less than 3%, by weight, of the end product and the amount of butylene oxide represented over 97%.

Example E was conducted in the same manner except that the initial reactant was Example D, preceding, and instead of using 566 grams, there was used instead 628 grams of the reactant. Instead of adding 563 grams of propylene oxide, there was added instead 633 grams of butylene oxide.

In this last example, five grams of sodium methylate were added as a catlyst to speed up the final stage of reaction. Operating conditions, such as temperature, time factor, etc., were substantially the same as described in the corresponding Examples A, B, D, C, and E, in aforementioned U.S. Patent 2,552,528.

It will be noted that in this final product approximately 200 moles of butylene oxide were employed per mole of tris(hydroxymethyl)aminomethane. On a percentage basis, the products represented approximately 1% tris(hydroxymethyl)aminomethane and 99% butylene oxide.

All examples, except the first stage, were substantially water-insoluble and xylene soluble.

It is immaterial in what order the oxides are added to tris(hydroxymethyl)aminomethane, so as to obtain the hereindescribed products. However, our preference is to add butylene oxide first, then propylene oxide, and then ethylene oxide. There are two advantages in so doing. The first advantage is that products obtained as far as the general average goes following this succession of oxides appears to give the most valuable product. Secondly, it is easier from a purely manipulative standpoint to oxybutylate tris(hydroxymethyl)aminomethane than to oxyethylate. There is less pressure on the autoclave than in oxyethylation. However, oxyethylation can be conducted perfectly satisfactorily.

So far as the use of butylene oxide is concerned, we prefer to use the straight chain isomers

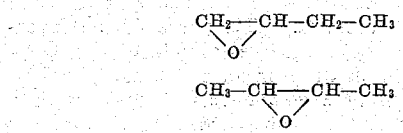

or a mixture of the two.

As noted previously, one can oxyethylate first and then add either one of the other two oxides, to wit, butylene oxide or propylene oxide. Similarly, one can add either oxide first, that is, propylene oxide or butylene oxide, and then add ethylene oxide, followed by the addition of the other oxide. Also, as is obvious, one need not add all the ethylene oxide alone or all the butylene oxide alone or all the propylene oxide alone. One could make a mixture of either one of the two, or all three, and use such mixture or mixtures as an oxyalkylating agent. Furthermore, one can add a fraction of any particular oxide and then add the rest at a subsequent stage. This may be applied not only to a single oxide but also to two of the three, or all three, of the oxides employed.

For the purpose of resolving petroleum emulsions of the water-in-oil type, we prefer to employ oxyalkylated derivatives, which are obtained by the use of monoepoxides, in such manner that the derivatives so obtained have sufficient hydrophile character to meet at least the test set forth in U.S. Patent No. 2,499,368, dated March 7, 1950, to De Groote and Keiser. In said patent such test for emulsification using a water-insoluble solvent, generally xylene, is described as an index of surface activity.

The above mentioned test, i.e., a conventional emulsification test, simply means that the preferred product for demulsification is soluble in a solvent having hydrophobe properties or in an oxygenated water-insoluble solvent, or a mixture containing a fraction of such solvent with the proviso that when such solution in a hydrocarbon solvent is shaken with water the product may remain in the nonaqueous solvent or, for that matter, it may pass into the aqueous solvent. In other words, although it is xylene soluble, for example, it may also be water soluble to an equal or greater degree.

For purpose of convenience, what is said hereinafter will be divided into four parts:

Part 1 is concerned with the oxyalkylation of tris(hydroxymethyl)aminomethane broadly so as to obtain products within the compositional limits of the herein described inventional limits of the herein described invention;

Part 2 is concerned with binary or tertiary products derived from tris(hydroxymethyl)aminomethane and a single oxide, or tris(hydroxymethyl)aminomethane and two oxides, which may be looked upon as intermediate products. More conveniently, the binary compositions may be considered as sub-intermediates and the tertiary compositional products as intermediates, all of which will be plain in light of the subsequent specification. Such intermediates are reacted with one more component, for instance, ethylene oxide, to give the four-component product described in Section 1, preceding.

Part 3 is concerned essentially with the oxyethylation of the intermediate described in Part 2, preceding. Needless to say, if the intermediate were obtained by the use of ethylene oxide, then the final stage would involve introduction of propylene oxide or butylene oxide.

Part 4 is concerned with the resolution of petroleum emulsions of the water-in-oil type by means of the previously described chemical compounds.

PART 1

The present invention is concerned with a cogeneric mixture which is the end product of a reaction or reactions involving 4 reactants. Assuming completeness of reaction and based on a mathematical average, the final product is characterized most conveniently in terms of the 4 component reactants. This phase of the invention is described elsewhere in greater detail.

In representing a mixture or an end product derived from 2 components or 3 components, there is no difficulty as far as using the plane surface of an ordinary printed sheet. For example, a 3-component system is usually represented by a triangle in which the apexes represent 100% of each component and any mixture or reaction product in terms of the 3 components is represented by a point in the triangular area in which the composition is indicated by perpendiculars from such point to the sides.

Chemists and physicists ordinarily characterize a 4-component system by using a solid, i.e., a regular tetrahedron. In this particular presentation each point or apex represents 100% of each of the 4 components, each of the 6 edges represents a line or binary mixture of the 2 components represented by the apexes or points at the end of the line or edge. Each of the 4 triangles or faces represent a tertiary mixture of the 3 components represented by the 3 corners or apexes and obviously signify the complete absence of the 4th component indicated by the corner or apex opposite the triangular face.

However, as soon as one moves to a point within the regular tetrahedron one has definitely characterized and specified a 4-component mixture in which the 4 components add up to 100%. Such a representation of a 4-component system is described in detail in U.S. Patent 2,549,438 to De Groote et al.

The invention will be described by reference to the accompanying drawings, which illustrate, in conventional graphical form, compositions used in accordance with the invention in terms of the four components. In the drawings, Figure 1 is a conventional tetrahedron in which a trapezoidal area is blocked out and which defines the scope of the invention. Figure 2 is a planar figure by which, having a fixed amount of one constituent, the other three may be determined.

Referring now to Figure 1, the composition represented by the block which is really a truncated triangular pyramid is designated by E, F, H, I, G and J. Bear in mind that the base of the truncated pyramid, that is, E, F, G, does not rest on the bottom of the equilateral base triangle. Point D represents 100% ethylene oxide. The base triangle represents the three other components and obviously 0% ethylene oxide. For purpose of what is said herein, the lower base of the truncated pyramid, E, F, G, is a base parallel to the equilateral triangle, but two units up, i.e., representing 2% of ethylene oxide. Similarly, the upper base of the truncated pyramid H, I, J, lies in a plane which is 39.5 units up from the base, to wit, represents 39.5 ethylene oxide. Specifically, then, this invention is concerned with the use of components in which the ethylene oxide component varies from 2% to 39.5% ethylene oxide. The problem then presented is the determination of the other three components, to wit, butylene oxide, propylene oxide, and tris(hydroxymethyl)aminomethane.

A simplification of the problem of characterizing a 4-component system which enters into the spirit of the present invention is this: If the amount of one component is determined or if a range is set, for example, 2% to 39.5% of ethylene oxide, then the difference between this amount and 100%, i.e., 60.5% to 98%, represents the amounts of percentages of the other three components combined, and these three components recalculated to 100° bases can be determined by use of an ordinary triangular graph.

Actually, as far as the limiting points in the truncated pyramid are concerned, which has been previously referred to in Figure 1, it will be noted that in the subsequent text there is a complete table giving the composition of these points for each successive range of ethylene oxide. In other words, a perfectly satisfactory repetition is available by means of these tables from a practical standpoint without necessarily resorting to the data of Figure 2.

Figure 2 shows a triangle and the three components other than ethylene oxide. These three components added together are less than 100%, to wit, 48.5% to 86.5%, but for reasons explained are calculated back to 100%. This point is clarified subsequently by examination of the tables. It will be noted that Figure 2 shows a triangle 1, 4 and 6, which represents the bases (top, bottom, or for that matter, intermediate) of the truncated pyramid, also the area in composition which is particularly pertinent to the present invention.

PART 2

As has been previously pointed out, the compositional limits of the herein described compounds are set by a truncated triangular pyramid which appears in Figure 1. It would be immaterial since the figure A, B, C, D, is a regular tetrahedron whether one considered A, B, C, as the base, B, C, D, as the base, A, C, D, as the base, or A, B, D, as the base. In order to eliminate repetitious description which is obvious in light of the examples included, we have selected A, B, C, as the base. Another reason for so doing is that the preference is to use ethylene oxide as the final component and this selection of A, B, C, as the base lends itself most readily to such presentation.

As has been suggested previously it is simplest to refer to Figure 2 and concern oneself with a 3-component system derived from tris(hydroxymethyl)aminomethane, propylene oxide and butylene oxide. Such product can then be reacted with 2% to 39.5% of ethylene oxide based on the final composition so as to give the preferred examples of the instant invention.

Returning now momentarily to the preparation of the 3-component intermediate shown in Figure 2, it is obvious that hardly any directions are required to the composition of the initial reactants based on the triangle in the attached drawing it will be noted that we have calculated the percentage of the three initial reactants for points 1 to 23, inclusive, so as to yield the intermediate derived from tris(hydroxymethyl)aminomethane, propylene oxide, and butylene oxide. These points determine not only the triangle but also numerous points within the triangle. Furthermore, the points are selected so the area is divided into five parts, three of which are triangles and two of which are four-sided figures. The triangles are defined by the points 1, 2 and 8; 2, 3 and 8, 5, 6 and 7; and the four-sided figures by the points 3, 4, 5 and 9 and finally 3, 8, 7 and 9.

Note that these data are included in Table I immediately following:

TABLE I

| Points on Boundary of Area | Tris-(hydroxymethyl)-aminomethane, Percent | Propylene Oxide, Percent | Butylene Oxide, Percent | Tris-(hydroxymethyl)-aminomethane, Percent | Propylene Oxide, Percent | Tris-(hydroxymethyl)-aminomethane, Percent | Butylene Oxide, Percent |
|---|---|---|---|---|---|---|---|
| 1 | 1.0 | 86.5 | 12.5 | 1.14 | 98.86 | 7.42 | 92.58 |
| 2 | 1.0 | 63.0 | 36.0 | 1.56 | 98.44 | 2.70 | 97.3 |
| 3 | 1.0 | 50.0 | 49.0 | 1.96 | 98.04 | 2.0 | 98.0 |
| 4 | 1.0 | 24.0 | 75.0 | 4.0 | 96.0 | 1.32 | 98.68 |
| 5 | 21.0 | 21.0 | 58.0 | 50.0 | 50.0 | 26.55 | 73.45 |
| 6 | 48.5 | 17.0 | 34.5 | 74.5 | 25.5 | 58.4 | 41.6 |
| 7 | 36.0 | 36.0 | 28.0 | 50.0 | 50.0 | 56.3 | 43.7 |
| 8 | 22.5 | 55.0 | 22.5 | 29.0 | 71.0 | 50.0 | 50.0 |
| 9 | 33.0 | 33.0 | 34.0 | 50.0 | 50.0 | 49.2 | 50.8 |
| 10 | 4.0 | 27.5 | 68.5 | 12.7 | 87.3 | 5.52 | 94.48 |
| 11 | 3.5 | 38.5 | 58.5 | 8.45 | 91.55 | 5.68 | 94.32 |
| 12 | 2.5 | 55.0 | 42.5 | 4.35 | 95.65 | 5.56 | 94.44 |
| 13 | 2.5 | 59.0 | 48.5 | 4.06 | 95.94 | 4.9 | 95.1 |
| 14 | 3.0 | 68.5 | 28.5 | 4.18 | 95.82 | 9.52 | 90.48 |
| 15 | 3.0 | 75.0 | 22.0 | 3.85 | 96.15 | 12.0 | 88.0 |
| 16 | 2.5 | 83.0 | 14.5 | 2.92 | 97.08 | 14.7 | 85.3 |
| 17 | 7.5 | 17.5 | 75.0 | 30.0 | 70.0 | 9.1 | 90.9 |
| 18 | 14.0 | 22.5 | 63.5 | 38.3 | 61.7 | 18.05 | 81.95 |
| 19 | 24.0 | 48.5 | 27.5 | 33.1 | 66.9 | 46.6 | 53.4 |
| 20 | 41.5 | 25.5 | 33.0 | 61.8 | 38.2 | 55.7 | 44.3 |
| 21 | 27.5 | 51.5 | 21.0 | 34.8 | 65.2 | 56.6 | 43.4 |
| 22 | 21.5 | 45.5 | 33.0 | 32.0 | 68.0 | 39.4 | 60.6 |
| 23 | 17.0 | 27.0 | 56.0 | 38.5 | 61.4 | 23.3 | 76.6 |

Note the first column gives various points on the boundary of the triangle or within the triangle. Note the next three columns represent the tertiary mixture corresponding to the initial reactants, i.e., the intermediate. These values represent percentages, by weight, of tris(hydroxymethyl)aminomethane, butylene oxide and propylene oxide. Thus, it is apparent that one can select any particular point in Figure 2 and simply use the appropriate amount of oxide to obtain the selected intermediate. For instance, in regard to point 1, all that would be necessary would be to mix 86.5 pounds of propylene oxide with 12.5 pounds of butylene oxide and use the mixture to oxyalkylate one pound of tris(hydroxymethyl)aminomethane.

Similarly, in Example 2, one need only mix 63 pounds of propylene oxide with 36 pounds of butylene oxide and use the mixture to oxylate one pound of trishydroxymethyl)aminomethane in a manner previously indicated.

Note that the fifth and sixth columns represent binary mixtures; for instance, in regard to the various points on the triangle and within the triangle we have calculated the initial mixture using tris(hydroxymethyl)aminomethane and propylene oxide in the first place and using tris(hydroxymethyl)aminomethane and ethylene oxide in the second place, which could be employed for subsequent oxyalkylation to give the particular composition required. Stated another way, we have calculated the composition for the sub-intermediate which, when reacted with the other oxide, propylene oxide or butylene oxide as the case may be, gives the intermediate, i.e., the three component product.

Note that a binary intermediate for the preparation of Part 1 can be prepared in any suitable manner involving 1.14 pounds of tris(hydroxymethyl)aminomethane and 98.86 pounds of propylene oxide.

Referring now to the tertiary mixture table, it is apparent that for point 1 tris(hydroxymethyl)aminomethane and propylene oxide together represent 87.5% and butylene oxide 12.5%. Therefore, one could employ 87.5 pounds of the binary mixture (a sub-intermediate) and react it with 12½ pounds of butylene oxide to give the three-component product (the intermediate).

Similarly, in regard to the fifth and six columns, the mixture involved tris(hydroxymethyl)aminomethane and propylene oxide. One could employ 1.56 pounds of tris(hydroxymethyl)aminomethane and 98.44 pounds of propylene oxide. Such mixture need only be reacted with butylene oxide in the proportion of 74 pounds of such mixture and 36 pounds of butylene oxide to give the desired 3-component product. This is obvious from the data in regard to the tertiary mixtures.

Referring now to columns 7 and 8, it is obvious one could produce an oxybutylated tris(hydroxymethyl)aminomethane and then subject it to reaction with propylene oxide. Using this procedure in regard to point 1, it is obvious the mixture is obtained by 7.42 pounds of tris(hydroxymethyl)aminomethane and 92.58 pounds of butylene oxide. This product can then be subjected to reaction with propylene oxide in the ratio of 13.5 pounds of the mixture and 86.5 pounds of propylene oxide. Similarly, in regard to point 2, it is obvious that one can react 2.70 pounds of tris(hydroxymethyl)aminomethane with 97.3 pounds of butylene oxide. 37 pounds of this mixture can then be reacted with 63 pounds of propylene oxide.

As previously pointed out, the oxyalkylation of tris(hydroxymethyl)aminomethane has been described in the literature and is described also in detail above. All one need do is employ such conventional oxyalkylation procedure to obtain products corresponding to the composition as defined. Attention is again directed to the fact that one need not add the entire amount of either oxide at one time but that a small portion of one could be added and then another small portion of the other, and the process repeated.

For purpose of illustration, we have prepared examples three different ways corresponding to the compositions of the so called intermediate in Figure 2. In the first series, butylene oxide and ethylene oxide were mixed; this series is indicated as 1a, 2a, 3a, through and including 23a; in the second series, which represents our preferred procedure, butylene oxide was used first, followed by propylene oxide. This series has been indicated as 1b, 2b, 3b, through and including 23b. Finally, in the third series propylene oxide was used first, followed by butylene oxide and the series identified as 1c, 2c, 3c, through and including 23c:

is F. Similarly, designations G, H, I, J, K, and L are products containing 27.5% to 39.5% of ethylene oxide, respectively, as shown in Table III.

TABLE II

| Composition Corresponding to following Point | Composition where Oxides are Mixed Prior to Oxyalkylation | Composition where Butylene Oxide used first followed by Propylene Oxide | Composition where Propylene Oxide used first followed by Butylene Oxide |
| --- | --- | --- | --- |
| 1 | 1a | 1b | 1c |
| 2 | 2a | 2b | 2c |
| 3 | 3a | 3b | 3c |
| 4 | 4a | 4b | 4c |
| 5 | 5a | 5b | 5c |
| 6 | 6a | 6b | 6c |
| 7 | 7a | 7b | 7c |
| 8 | 8a | 8b | 8c |
| 9 | 9a | 9b | 9c |
| 10 | 10a | 10b | 10c |
| 11 | 11a | 11b | 11c |
| 12 | 12a | 12b | 12c |
| 13 | 13a | 13b | 13c |
| 14 | 14a | 14b | 14c |
| 15 | 15a | 15b | 15c |
| 16 | 16a | 16b | 16c |
| 17 | 17a | 17b | 17c |
| 18 | 18a | 18b | 18c |
| 19 | 19a | 19b | 19c |
| 20 | 20a | 20b | 20c |
| 21 | 21a | 21b | 21c |
| 22 | 22a | 22b | 22c |
| 23 | 23a | 23b | 23c |

TABLE III
[Proportions by weight.]

| Ex. No. | Ethylene Oxide | 3-Component Intermediate of Part 2, Preceding | Designation |
| --- | --- | --- | --- |
| 1 | 2 | 98 | A. |
| 2 | 3 | 97 | |
| 3 | 4 | 96 | |
| 4 | 5 | 95 | B. |
| 5 | 6 | 94 | |
| 6 | 7 | 93 | |
| 7 | 8 | 92 | |
| 8 | 9 | 91 | |
| 9 | 10 | 90 | C. |
| 10 | 11 | 89 | |
| 11 | 12 | 88 | |
| 12 | 13 | 87 | |
| 13 | 14 | 86 | |
| 14 | 15 | 85 | D. |
| 15 | 16 | 84 | |
| 16 | 17 | 83 | |
| 17 | 18 | 82 | |
| 18 | 19 | 81 | |
| 19 | 20 | 80 | E. |
| 20 | 21 | 79 | |
| 21 | 22 | 78 | |
| 22 | 23 | 77 | |
| 23 | 24 | 76 | |
| 24 | 25 | 75 | F. |
| 25 | 27.5 | 72.5 | G. |
| 26 | 30.0 | 70 | H. |
| 27 | 32.5 | 67.5 | I. |
| 28 | 35.0 | 65 | J. |
| 29 | 37.5 | 62.5 | K. |
| 30 | 39.5 | 60.5 | L. |

The products illustrated by the preceding examples are not, of course, the final products of the present invention. They represent intermediates. However, such intermediates require treatment with ethylene oxide to yield the product of the present invention.

PART 3

In Part 2 preceding there has been described the preparation of sub-intermediates and intermediates. As previously noted, these intermediates need only be subjected to conventional oxyethylation to produce the products described in the present invention. The amount of ethylene oxide employed is such that the final composition conforms to the composition set forth in Figure 1. This means that the amount of ethylene oxide used as a reactant represents 2% to 39.5% of the final product with the proviso that the remainder of the product is represented by the three remaining components within the proportions set forth in Figure 2.

In preparing examples we have done nothing more except use conventional oxyethylation, using an alkaline catalyst such as powdered caustic soda or sodium methylate. We have operated at temperatures varying from 110° C. to 135° C. We have used oxyethylation pressures of 10 pounds per square inch up to 30 pounds per square inch, but usually not over 15 pounds per square inch. The time period has varied from 15 minutes when just a small amount of oxide was employed, up to as much as 4 to 6 hours when a larger amount of oxide was used.

Obviously the simplest of calculations is involved although we have given the data in tabular form for the reason that we have indicated that the product containing 2% of ethylene oxide carries the designation A; the one having 5% ethylene oxide carries the designation B; the one having 10% ethylene oxide is C; the one having 15% is D; the one having 20% is E; and the one having 25%

Since it would be impossible to prepare all the variants which have been previously suggested, we have proceeded as follows: We have prepared 30 examples corresponding to the 23 points in Figure 2 by varying the amount of ethylene oxide from 2% to 39.5%. One example we have used 2%, another 5%, another 10%, another 15%, another 20%, and another 25%, and on up to 39.5%, as shown. The intermediates used are those described in Table II, preceding. The prepared products have been described as follows: A–1a, B–2b, C–3c, D–4a, etc. A–1a is, of course, the product obtained by using 98% of intermediate 1a previously described in Table II, and 2%, by weight, of ethylene oxide; Example B–2b is obviously obtained by reacting 95%, by weight, of intermediate 2b with 5%, by weight, of ethylene oxide. Example C–3c is obtained by reacting 90%, by weight, of intermediate 3c with 10%, by weight, of ethylene oxide. Example D–4a is obtained by reacting 85% of intermediate 4a with 15%, by weight, of ethylene oxide. Example E–5b is obtained by reacting 80% of intermediate 5b with 20%, by weight, of ethylene oxide. Example F–6c is obtained by reacting 75% of intermediate 6c with 25% of ethylene oxide.

It will be noted that the last series of 7 examples in Table IV are concerned with compositions corresponding to points 1, 5, 10, 15, 16, 20 and 23 in Figure 2. In these instances the compound having the F designation has 25% ethylene oxide; the one with a G designation has 27½%; the one with the H designation, 30%; the one with the I designation, 32½%; the one with the J designation, 35%; the one with the K designation, 37½%; and the one with the L designation, 39½%. Note that in one instance the table shows all three types of preparation, that is in the instance of J16a, J16b, and J16c. The remaining examples in Table IV, following, are self-explanatory.

TABLE IV

| Composition Corresponding to following Point | Composition where Oxides are Mixed Prior to Oxyalkylation | Composition where Butylene Oxide used first followed by Propylene Oxide | Composition where Propylene Oxide used first followed by Butylene Oxide |
| --- | --- | --- | --- |
| 1 | A-1a | 1b | 1c |
| 2 | 2a | B-2b | 2c |
| 3 | 3a | 3b | C-3c |
| 4 | D-4a | 4b | 4c |
| 5 | 5a | E-5b | 5c |
| 6 | 6a | 6b | F-6c |
| 7 | A-7a | 7b | 7c |
| 8 | 8a | B-8b | 8c |
| 9 | 9a | 9b | C-9c |
| 10 | D-10a | 10b | 10c |
| 11 | 11a | E-11b | 11c |
| 12 | 12a | 12b | F-12c |
| 13 | A-13a | 13b | 13c |
| 14 | 14a | B-14b | 14c |
| 15 | 15a | 15b | C-15c |
| 16 | D-16a | 16b | 16c |
| 17 | 17a | E-17b | 17c |
| 18 | 18a | 18b | F-18c |
| 19 | A-19a | 19b | 19c |
| 20 | 20a | B-20b | 20c |
| 21 | 21a | 21b | C-21c |
| 22 | D-22a | 22b | 22c |
| 23 | 23a | E-23b | 23c |
| 1 | 1a | 1b | F-1c |
| 5 | G-5a | 5b | 5c |
| 10 | 10a | H-10b | 10c |
| 15 | 15a | 15b | I-15c |
| 16 | J-16a | J-16b | J-16c |
| 20 | 20a | K-20b | 20c |
| 23 | 23a | 23b | L-23c |

The same procedures have been employed using other butylene oxides including mixtures having considerable isobutylene oxide and mixtures of the straight chain isomers with greater or lesser amount of the 2,3 isomer.

Where reference has been made in previous examples to the straight chain isomer, the product used was one which was roughly 85% or more of the 1,2 isomer and approximately 15% of the 2,3-cis- and the 2,3-trans isomer with substantially none or not over 1% of the isobutylene oxide.

In the preceding procedures one oxide has been added and then the other. One need not follow this procedure. The three oxides can be mixed together in suitable proportions and subsequently subjected to joint oxyalkylation so as to obtain products coming within the specified limits. In such instances, of course, the oxyalkylation may be described as random oxyalkylation insofar that one cannot determine the exact location of the butylene oxide, propylene oxide or ethylene oxide groups. In such instances the procedure again is identically the same as previously described, and, as a matter of fact, we have used such methods in connection with tris(hydroxymethyl(aminomethane.

If desired, one may add part of one oxide and then all the others and then return to the use of the first oxide. For example, one might use the procedure previously suggested, adding some butylene oxide, all the propylene oxide, all the ethylene oxide and then the remainder of the butylene oxide. Or inversely, one may add some propylene oxide, then all the butylene oxide, then the remainder of the propylene oxide, and then the ethylene oxide. Or, any one of the three oxides could be added in portions so one oxide is added first, then the other two, then the first oxide is added again, then the other two. We have found no advantage in so doing; indeed, our preference has been to add all the butylene oxide first, then all the propylene oxide, and then the required amount of ethylene oxide.

As previously pointed out, tris(hydroxymethyl)aminomethane can be oxyethylated in the same way it is oxybutylated, i.e., by heating the tris(hydroxymethyl)aminomethane, using a suitable catalyst, particularly an alkaline catalyst, and adding the ethylene oxide. The changes previously mentioned are of difference in degree only. In other words, oxyethylation will take place at a lower temperature, for instance, a top temperature of probably 110° to 135° C. instead of 145° to 150° C. The same weight of ethylene oxide could be added in 75% to 85% of the time required for butylene oxide. The pressure during the reaction, instead of being 20 to 35 pounds as in the case of butylene oxide, is apt to be 10 to 30 pounds and at times a little higher, but frequently operated at 15 pounds per square inch or less. Otherwise, there is no difference. Note, however, that it is easier and preferable to oxyethylate last, i.e., have a liquid reaction product obtained by the use of butylene oxide or propylene oxide, for a combination of the two before the oxyethylation step.

Also, if desired, the use of ethylene carbonate is a very convenient way of oxyethylating tris(hydroxymethyl)-aminomethane. In fact, it can be oxyethylated without the use of pressure.

One can oxyalkylate using an acid catalyst or an alkaline catalyst or at least in part, without the use of any catalyst although such procedure is extremely slow and uneconomical. In other words, any one of the conventional catalysts used in oxyalkylation may be employed. It is our preference, however, to use an alkaline catalyst such as sodium methylate, caustic soda, or the like.

Actually, tris(hydroxymethyl)aminomethane may contain 1%, or somewhat less, of water. When such compound is heated to 140° to 150° and subjected to vacuum, particularly when anhydrous nitrogen is passed through the heated mass, the resultant product appears to become substantially water free. Even so, there may be a few tenths of a percent and perhaps only a trace of water remaining in some instances.

The products obtained by the above procedure usually show some color varying from a light amber to a pale straw. They can be bleached in the usual fashion, using bleaching clays, charcoal, or an organic bleach, such as peroxide or peracetic acid, or the like.

Such products also have present a small amount of alkaline catalyst which can be removed by conventional means, or they can be neutralized by adding an equivalent amount of acid, such as hydrochloric acid. For many purposes the slight amount of residual alkalinity is not objectionable.

There are certain variants which can be employed without detracting from the metes and bounds of the invention, but for all practical purposes there is nothing to be gained by such variants and the result is merely increased cost. For instance, any one of the two oxides can be replaced to a minor percentage and usually to a very small degree, by oxide which would introduce substantially the same group along with a side chain, for instance, one could employ glycidyl methyl ether, glycidyl ethyl ether, glycidyl isopropyl ether, glycidyl butyl ether or the like.

Increased branching also may be effected by the use of an imine instead of a glycide, or a methyl glycide. Thus one can use ethylene imine or propylene imine in the same way described for glycide or methyl glycide. An additional effect is obtained due to the basicity of the nitrogen atom. The same thing is true so far as the inclusion of nitrogen atoms, if one uses a compound of the kind previously described such as a dialkylaminoepoxypropane. Excellent products are obtained by reacting tris(hydroxymethyl)aminomethane with one to five moles of ethylene imine and then proceeding in the same manner herein described.

In the hereto appended claims reference has been made to "glycol ethers of tris(hydroxymethyl)aminomethane." Actually, it well may be that the products should be referred to as "polyol ethers of tris(hydroxymethyl)aminomethane" in order to emphasize the fact that the final products of reaction have more than two hydroxyl radicals. However, the products may be considered as hypothetically derived by reaction of tris(hydroxymethyl)aminomethane with the glycols, such as ethylene glycol, butylene glycol, propylene glycol, or polyglycols. For this reason there seems to be a preference to use the terminology "glycolethers of tris(hydroxymethyl)aminomethane."

Attention again is directed to what has been said previously, to wit, that the four reactants as exemplified by the truncated triangular pyramid E, F, G, H, I, J, in the regular tetrahedron, A, B, C, D, as shown in Figure 1, might just as well be presented from any other position, that is, a position in which A, C, D, happen or B, C, D, or A, B, D, happen to be the base instead of A, B, C. However, such further elaboration would add nothing to what has been said previously and is obviously omitted for purpose of brevity.

PART 4

As to the use of conventional demulsifying agent reference is made to U.S. Patent No. 2,626,929, dated January 7, 1953, to De Groote, and particularly to Part 3. Everything that appears therein applies with equal force and effect to the instant process, noting only that where reference is made to Example 13b in said text beginning in column 15 and ending in column 18, reference should be to Example J–16b, herein described.

Having thus described our invention, what we claim as new and desire to obtain by Letters Patent is:

1. A process for breaking petroleum emulsions of the water-in-oil type characterized by subjecting the emulsion to a demulsifying agent including a cogeneric mixture of a homologous series of glycol ethers of tris(hydroxymethyl)aminomethane; said cogeneric mixture being derived exclusively from tris(hydroxymethyl)aminomethane, butylene oxide, propylene oxide and ethylene oxide in such weight proportions, so that the average composition of said cogeneric mixture stated in terms of the initial reactants, lies approximately within the truncated triangular pyramid identified as E, H, F, I, G and J in Figure 1, with the proviso that the percentage of ethylene oxide is within the limits of 2% to 39.5% by weight, and the remaining three initial reactants recalculated to 100% basis, lie approximately within the triangle defined in Figure 2 by points 1, 4 and 6.

2. The process of claim 1 with the proviso that oxyalkylation takes place in presence of an alkaline catalyst.

3. The process of claim 1 with the proviso that oxyalkylation takes place in presence of an alkaline catalyst and that the butylene oxide be added first.

4. The process of claim 1 with the proviso that oxyalkylation takes place in presence of an alkaline catalyst and that the butylene oxide be added first, and with the further proviso that the butylene oxide is substantially free from isobutylene oxide.

5. The process of claim 1 with the proviso that oxyalkylation takes place in presence of an alkaline catalyst and that the butylene oxide be added first, and with the further proviso that the butylene oxide consists of 85% or more of the 1,2-isomer and approximately 15% or less of the 2,3-isomeric form, and is substantially free from isobutylene oxide.

6. The process of claim 5 with the proviso that the reactant composition falls within the triangle defined by points 1, 2 and 8 in Figure 2.

7. The process of claim 5 with the proviso that the reactant composition falls within the triangle defined by points 2, 3 and 8 in Figure 2.

8. The process of claim 5 with the proviso that the reactant composition falls within the four sided figure defined by points 8, 3, 9 and 7.

9. The process of claim 5 with the proviso that the reactant composition falls within the four-sided figure defined by points 3, 4, 5 and 9.

10. The process of claim 5 with the proviso that the reactant composition falls within the triangle defined by points 5, 6 and 7.

11. A process for breaking petroleum emulsions of the water-in-oil type characterized by subjecting the emulsion to a demulsifying agent including a cogeneric mixture of a homologous series of glycol ethers of tris(hydroxymethyl)aminomethane; said cogeneric mixture being derived exclusively from tris(hydroxymethyl)aminomethane, butylene oxide, propylene oxide and ethylene oxide in such weight proportions so that the average composition of said cogeneric mixture stated in terms of the initial reactants, lies approximately within the truncated triangular pyramid identified as E, H, F, I, G and J in Figure 1, with the proviso that the percentage of ethylene oxide is within the limits of 2% to 39.5%, by weight, and the remaining three initial reactants recalculated to 100% basis, lie approximately within the triangle defined in Figure 2 by points 1, 4 and 6; with the proviso that the hydrophile properties of said cogeneric mixture in an equal weight of xylene, are sufficient to produce an emulsion when said xylene solution is shaken vigorously with one to three volumes of water.

12. The process of claim 11 with the proviso that oxyalkylation takes place in presence of an alkaline catalyst.

13. The process of claim 11 with the proviso that oxyalkylation takes place in presence of an alkaline catalyst and that the butylene oxide be added first.

14. The process of claim 11 with the proviso that oxyalkylation takes place in presence of an alkaline catalyst and that the butylene oxide be added first, and with the further proviso that the butylene oxide is substantially free from isobutylene oxide.

15. The process of claim 11 with the proviso that oxyalkylation takes place in presence of an alkaline catalyst and that the butylene oxide be added first, and with the further proviso that the butylene oxide consists of 85% or more of the 1,2-isomer and approximately 15% or less of the 2,3-isomeric form, and is substantially free from isobutylene oxide.

16. The process of claim 15 with the proviso that the reactant composition falls within the triangle defined by points 1, 2 and 8 in Figure 2.

17. The process of claim 15 with the proviso that the reactant composition falls within the triangle defined by points 2, 3 and 8 in Figure 2.

18. The process of claim 15 with the proviso that the reactant composition falls within the four-sided figure defined by points 8, 3, 9 and 7.

19. The process of claim 15 with the proviso that the reactant composition falls within the four-sided figure defined by points 3, 4, 5 and 9.

20. The process of claim 15 with the proviso that the reactant composition falls within the triangle defined by points 5, 6 and 7.

References Cited in the file of this patent

UNITED STATES PATENTS

| | | |
|---|---|---|
| 2,233,383 | De Groote et al. | Feb. 25, 1941 |
| 2,262,736 | De Groote et al. | Nov. 11, 1941 |
| 2,290,416 | De Groote | July 21, 1942 |
| 2,457,634 | Bond et al. | Dec. 28, 1948 |
| 2,549,438 | De Groote et al. | Apr. 17, 1951 |
| 2,552,530 | De Groote et al. | May 15, 1951 |
| 2,574,544 | De Groote | Nov. 13, 1951 |
| 2,589,200 | Monson | Mar. 11, 1952 |
| 2,622,099 | Ferrero et al. | Dec. 16, 1952 |
| 2,649,483 | Huscher et al. | Aug. 18, 1953 |
| 2,677,700 | Jackson et al. | May 4, 1954 |